United States Patent Office 3,781,319
Patented Dec. 25, 1973

3,781,319
PROCESS FOR PREPARING ISOCYANATES
Stanely Wawzonek, Iowa City, Iowa, and Richard C. Gueldner, Starkville, Miss., assignors to State of Iowa, University of Iowa, Iowa City, Iowa
No Drawing. Continuation-in-part of application Ser. No. 839,650, July 7, 1969, which is a continuation-in-part of abandoned application Ser. No. 482,941, Aug. 26, 1965. This application Sept. 28, 1970, Ser. No. 76,327
Int. Cl. C07c 119/04
U.S. Cl. 260—453 P
16 Claims

ABSTRACT OF THE DISCLOSURE

Isocyanates are prepared by pyrolyzing an aminimide having the formula

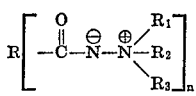

wherein $R_1$, $R_2$ and $R_3$ are alkyl, aryl and radicals in which $R_2$ and $R_3$ are joined to form a heterocyclic ring, R is an aliphatic, cycloaliphatic or aromatic group and $n$ is an integer of at least 1, usually 1 to 4.

CROSS-REFERENCE

This application is a continuation-in-part of copending application, Ser. No. 839,650, filed July 7, 1969, now abandoned which in turn is a continuation-in-part of application Ser. No. 482,941, filed Aug. 26, 1965, and now abandoned, the disclosures of which are relied on and incorporated herein.

SPECIFICATION

This invention relates to a process for the preparation of isocyanates and most particularly, organic isocyanates.

Organic isocyanates are useful chemical intermediates in the formation of herbicides, pharmaceuticals, polymers, and lubricants. In particular, diisocyanates, such as toluene diisocyanate, are commercially used as starting materials for the preparation of polyurethanes. Additionally, certain isocyanates, such as phenyl isocyanate, are useful laboratory tools for the characterization of organic compounds. Isocyanates also find use in the surface treatment of hydroxyl-containing polymeric materials to improve water-repellence.

A large body of chemical literature has developed on the preparation of isocyanates. Exemplary methods disclosed by the prior art for preparing isocyanates are as follows: (a) By the reaction of an alkyl sulfate with potassium cyanate in the presence of sodium carbonate; (b) By the reaction of an aliphatic or aromatic primary amine with phosgene to produce a carbamyl chloride which, upon heating yields the desired isocyanate; (c) By the oxidation of an isocyanide with a mild oxidizing agent such as a heavy metal oxide; and (d) From acid azides by the elimination of nitrogen and subsequent rearrangement of the intermediate. Although these methods are currently used to produce isocyanates, they present certain disadvantages. For example, the use of acid azides is undesirable since these compounds are explosive.

Accordingly, it is the object of this invention to provide a new and efficient process for preparing isocyanates from readily available and nonexplosive starting materials.

In attaining the object of this invention, one feature resides in pyrolyzing aminimides to form the isocyanates.

Other objects, features and advantages of the invention will be apparent from the disclosure set forth herein.

In accordance with this invention, isocyanates are prepared by the pyrolysis of aminimides. The preferred aminimides useful in this process are those of the formula

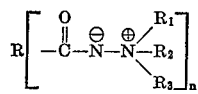

wherein R is an aliphatic, cycloaliphatic, or aromatic group having the valence $n$; $R_1$, $R_2$, and $R_3$ are alkyl, aryl, or groups in which $R_2$ and $R_3$ are joined to form a heterocyclic ring, and $n$ is an integer of at least 1. Upon pyrolysis, these aminimides yield isocyanates of the formula

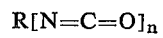

and tertiary amines of the formula

The process of this invention can be used to form mono-, di- and polyisocyanates, depending upon the particular aminimide employed. As just indicated, the aminimides used in the preparation of isocyanates have the formula:

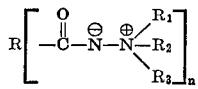

In this formula, R is any saturated or unsaturated aliphatic, cycloaliphatic, or aromatic group of valence $n$. R can be alkyl, alkenyl, polymethylene, or alkenylene. Preferably, R contains from 1–28 carbon atoms, and is substituted with $n$ aminimide groups wherein $n$ is an integer of at least 1. While $n$ can be any integer, in practice it is preferred that $n$ be an integer of from 1 to 4. On pyrolysis, each aminimide group yields an isocyanate substituent. As used in this specification and the appended claims, valence refers to the number of aminimides or isocyanate groups found on each R group. Nonlimiting examples of suitable R groups include methyl, ethyl, propyl, isopropyl, hexyl, cyclopentyl, cyclohexyl, dodecyl, octadecyl, phenyl, benzyl, naphthyl, myristyl, cyclohexenyl, butenyl, dodecynyl, linoleyl, erucyl, o-phenylene, m-phenylene, p-phenylene, methylene, dimethylene, trimethylene, and ethylene. The R group can contain functional substituents, but such substituents must not affect the aminimide structure of the molecule. Suitable functional substituents include halogens and alkoxy groups. Additionally, ketone and aldehyde groups can be present as these do not affect the aminimide structure. Certain functional groups which have no effect on the aminimide but which react with the isocyanate product, such as hydroxyl, amine, and carboxyl, are to be avoided. Naturally, these functional groups can be present if they are protected by conversion to nonreactive derivatives.

As indicated above, $R_1$, $R_2$ and $R_3$ are alkyl and aryl groups. In a preferred embodiment, these groups contain between 1 and 8 carbon atoms. Suitable groups include methyl, ethyl, propyl, butyl, pentyl, hexyl, heptyl, octyl, benzyl, phenyl, totyl and xylyl. Methyl is the particularly preferred group. Additionally, $R_2$ and $R_3$ can be joined, either through a carbon-to-carbon bond or through a hetero-atom, to form a heterocyclic ring with the nitrogen atom. Nonlimiting examples of suitable heterocyclic rings include pyrrolidine, pyrrole, pyrroline, piperidine, piperazine, and morpholine.

Examples of aminimides which can be pyrolyzed to yield isocyanates include the following: trimethylamine benzimide, triethylamine benzimide, trihexylamine benzimide, methyldiethylamine benzimide, phenyldimethylamine bendimide, methyldiisopropylamine benzimide, trimethylamine - 2 - methylbenzimide, N-methylpyrrolidine acetimide, N - ethylpyrrolidine acetimide, N - methyl-2- phenylpyrrolidine acetimide, N-methylpyrrolidine propionimide, diphenylmethyl-amine benzimide, dimethylnaphthylamine benzimide, o-bis-tri-methylamine phthalimide, m-bis-trimethylamine phthalimide, p-bis-trimethylamine phthalimide, 1,2,4,5-tetrakis-trimethyl-amine pyromellitimide, bis-trimethylamine malonimide, bis-trimethylamine succinimide, bis-trimethylamine adipimide, and bis-trimethylamine fumarimide.

In accordance with this invention, the aminimide is pyrolyzed by heating to its decomposition temperature. While the particular temperature employed will depend upon the aminimide being treated, temperature in the range of from 150°–300° C. are generally sufficient to produce high yields of isocyanates from the aminimide. Pyrolysis can be accomplished at atmospheric, reduced, or elevated pressure. Following pyrolysis, the isocyanate product is separated from the tertiary amine and other decomposition products of the aminimide. Any recovery process normally used to separate materials of this type can be used; for example, fractional distillational, fractional crystallization, extraction, etc. In many cases, either the tertiary amine or the isocyanate will be gaseous at the temperature of pyrolysis, while the other product will be liquid or solid. When this occurs, the products can be easily separated by conveying the gaseous component to a cold trap.

Aryl isocyanates trimerize rapidly in the presence of lower trialkyl amines. For this reason, ordinary separation as described above will not suffice to yield the aryl isocyanate product. One method which may be used to obtain an aryl isocyanate product is to immediately separate the isocyanate and amine products prior to trimerization. Another method is to use an aminimide which does not produce a lower trialkyl amine upon decomposition. These two methods obviously have practical problems inherent therewithin. Therefore, another method which has been found particularly useful for the purpose of this invention in order to obtain an aryl isocyanate product and which does not have attendant thereto the problems of the above two methods is to trap or cap the aryl isocyanate while it is being formed by reacting it with aniline during pyrolysis of the aminimide. The product so formed is an arylurea which, of course, does not trimerize and which may be converted into the aryl isocyanate after collection by any conventional procedure such as that disclosed in U.S. Pat. No. 2,773,086. The disclosure of this patent is incorporated herein by reference.

For the purposes of this invention and as disclosed in U.S. Pat. No. 2,773,086, the corresponding urea, after separation in a known manner from the alkylamine product, is converted to an aryl isocyanate by reacting in the vapor phase, the urea with a hydrogen halide in a molar ratio of 1:1 so as to yield the free isocyanate. If the molar ratio of hydrogen halide to urea is greater than 1:1, mixtures of isocyanate and the corresponding halide are formed.

Another method of obtaining an aryl isocyanate is to trap or cap the product during formation by reacting it with a high boiling alcohol such as octyl alcohol to thereby form the corresponding urethane. After separation of the urethane from the alkyl amine using known techniques, the urethane is re-converted to the aryl isocyanate in accordance with the conventional procedure described in Shikizai Kyokaishi, vol. 36, p. 461 (1965), the disclosure of which is incorporated herein by reference.

A still further method of obtaining an untrimerized aryl isocyanate despite the presence of a lower alkylamine is to start with a dialkyl aryl aminebenzimide. Preferably, such a starting material is phenyldimethylamine benzimide. Quite surprisingly, it has been found that upon pyrolysis of this compound, there is formed untrimerized phenylisocyanate and dimethylaniline. This latter product does not trimerize phenyl isocyanate and the mixture can be separated by fractional distillation to give pure phenylisocyanate.

The aminimide starting materials employed in the process of this invention are well known chemical compounds and can be prepared in accordance with the teachings of the prior art. In general, these aminimides are prepared by first forming an acyl hydrazine by the reaction of an acid anhydride or acid chloride with an unsymmetrical hydrazine. As this particular reaction is exothermic, it is preferred to cool the reaction mixture and to carry out the reaction in the presence of an inert, organic solvent capable of dissolving the reagents, such as ethers, ketones, esters, and the like.

The acyl hydrazine prepared in this manner can be converted to an aminimide by two routes. Firstly, the acyl hydrazine can be reacted with an alkyl halide in the presence of an alkali metal alkoxide to directly yield the aminimide. Secondly, the acyl hydrazine can be reacted with an alkyl halide, or an ester of a strong organic acid such as a sulfonic acid, to yield the hydrazonium salt. By titrating an aqueous solution of the hydrazonium salt with base, the aminimide is formed. Generally, the aminimide is isolated by extraction with a halogenated hydrocarbon such as chloroform. When the aminimide is to be substituted with one or more aryl groups, the aryl groups must be present in the original unsymmetrical hydrazine. The reason for this is that aryl halides cannot be used to arylate the acyl hydrazine. Generally, when the aminimides are made by the herein described sequence of reactions, at least one of $R_1$, $R_2$ and $R_3$ will be alkyl.

The preparation of the aminimide starting material is illustrated by the following sequence of reactions:

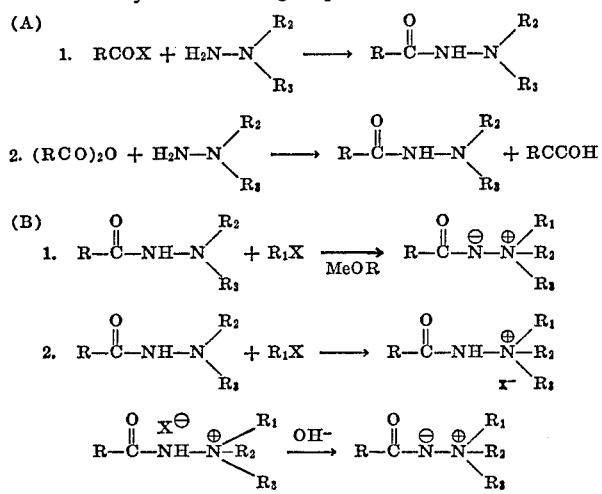

In the above reaction scheme, X is halogen or an organic acid radical, and MeOR represents the alkali metal alkoxide.

By employing polybasic acid chlorides, such as the acid chlorides of phthalic acid, pyromellitic acid, malonic acid, succinic acid, adipic acid, and fumaric acid, in the above reaction scheme, polyaminimides can be formed. These polyaminimides are then pyrolyzed to produce polyisocyanates such as 1,2-diisocyanatobenzene, 1,4-diisocyanatobenzene, 1,3-diisocyanatobenzene, 1,2,4,5-tetraisocyanatobenzene, methylene diisocyanate, ethylene diisocyanate, propylene diisocyanate, and 1,2-diisocyanatoethylene.

The following examples will point out, by way of illustration only, certain embodiments of this invention. Unless otherwise indicated, all parts are by weight.

EXAMPLE 1

Preparation of 1,1-dimethyl-2-benzoylhydrazine 140 grams (1.0 mole) benzoyl chloride in 300 milliliters absolute ether were added to an ice bath-cooled solution of 60 grams (1.0 mole) of unsymmetrical dimethyl hydrazine and 200 grams (1.97 moles) triethylamine in 1200 milliliters absolute ether, with stirring. The resulting mixture was stirred for 12 hours while warming to room temperature, followed by removal of the ether by distillation. 40 grams (1.0 mole) sodium hydroxide in 200 milliliters water was added to the remaining solid to form a 2-phase product. The phases were separated and the nonaqueous layer heated in vacuo to remove triethylamine. Benzene was added to the residue to remove water as the benzene azeotrope. After the remaining benzene was removed in vacuo, 149 grams of a solid off-white product, melting at 98° to 103° C., was recovered. The product was recrystallized from 100 milliliters acetone and 200 milliliters hexame, and purified 1,1-dimethyl-2-benzylhydrazine melting at 104° to 106° C. was obtained. 105 grams of this material was recovered, resulting in a 64% yield.

EXAMPLE 2

Preparation of the hydrazonium salt of 1,1-dimethyl-2-benzoylhydrazine

The hydrazonium salt of 1,1-dimethyl-2-benzoylhydrazine was prepared by refluxing a solution of 114 grams (0.694 mole) 1,1-dimethyl-2-benzoylhydrazine and 130 grams (0.697 mole) methyl p-toluenesulfonate in 100 ml. benzene for 23 hours. Fine crystals separated during this refluxing period and were collected by filtration. After drying, 225 grams of crystalline product, melting at 180–181.5° C. were recovered, giving a yield of 92.2%. After recrystallization from a mixture of chloroform and ethyl acetate, the hydrazonium salt weighed 224 grams and melted at 180.5° to 182° C. The product analyzed as follows: Calculated for $C_{17}H_{22}N_2O_4S$ (percent): C, 58.27; H, 6.33; N, 7.99. Found (percent): C, 58.18; H, 6.25; N, 7.79.

EXAMPLE 3

Preparation of the aminimide from the hydrazonium salt of 1,1dimethyl-2-benzoylhydrazine To 247 grams (0.705 mole) of the methyl-p-toluenesulfonate derivative of 1,1-dimethyl-2-benzoylhyrazine in 200 ml. water were added 28.2 grams sodium hydroxide. After the sodium hydroxide dissolved, the resulting solution was extracted from six 250 ml. portions of chloroform and the chloroform extracts dried over sodium sulfate. The chloroform was removed by distillation with the last portion of chloroform being removed in vacuo. A residue of 91 grams remained. This residue was recrystallized from a chloroform-hexane mixture to give 56 grams of trimethylamine benzimide melting at 166.5°–168° C.

The aqueous layer from the chloroform extraction was evaporated to a crystalline paste on a steam bath, and the paste dried for four hours at 110° C. The residue was extracted with three 150 ml. portions of chloroform. Upon removal of the chloroform by distillation, a residue of 38 grams was obtained. This residue was combined with the mother liquor residues from the original extraction product and the combined residue recrystallized from chloroform hexane to give 25 grams of trimethylaminebenzimide melting at 166.5° to 168° C. The total yield of pure material was 81 grams, giving a yield of 64.5%.

EXAMPLE 4

Preparation of the trimer of phenyl isocyanate

Phenyl isocyanate was prepared by pyrolyzing trimethylamine benzimide. In a distillation apparatus, 109 grams trimethylaminebenzimide were heated at 220–230° C. A vigorous decomposition took place, producing a gaseous product (19.9 grams, 55% yield) which was collected in a cold trap at −78° C. and identified as trimethylamine and a liquid product which solidified in 20 minutes while hot. This solid weighed 44.2 grams and melted at 289°–290° C. when recrystallized from toluene. A 60.4% yield of this product was obtained. Infrared analysis confirmed that the solid product was the trimer of phenyl isocyanate.

EXAMPLE 5

Preparation of phenyl isocyanate

A mixture of 20.00 g. (0.112 mole) of trimethylamine benzimide and 20.97 g. (0.225 mole) of anhydrous aniline was refluxed until trimethylamine evolution ceased. The mixture was protected from moisture by means of a drying tube. Excess aniline was removed using reduced pressure and a white solid was obtained. This white solid product was recrystallized from methanol, filtered, and dried. The product yield was 21.30 g. corresponding to 0.100 moles or 89.7%. The melting point of the product was 240–1° C. The structure was shown to be diphenylurea by its melting point, mixed melting point with the known compound (239.5–241° C.), NMR, and infrared spectrum. Equimolar portions of the diphenylurea product and hydrogen chloride are then reacted together using the procedure and apparatus set forth in U.S. Pat. No. 2,773,086 and phenyl isocyanate obtained thereby.

EXAMPLE 6

Preparation of phenyl isocyanate

Phenyl isocyanate was prepared by pyrolysing phenyldimethylaminebenzimide (M.P. 158–9°). In a distillation apparatus, 8.83 g. of phenyldimethylaminebenzimide was heated at 170° C. and the volatile products (7.99 g.) were collected. Vapor phase chromatography analysis of the product indicated a mixture of 51.5% phenyl isocyanate and 48.5% dimethylaniline. Distillation using an 8-plate column at reduced pressure (95 mm.) gave a 70% yield of phenyl isocyanate boiling at 94–6° C. (95 mm.).

EXAMPLE 7

Preparation of 1-acetamino-2-phenylpyrrolidine

To an ice bath-cooled, stirred solution of 75.0 grams (0.462 mole) 1-amino-2-phenylpyrrolidine in 300 ml. benzene was added dropwise a solution of 47.1 grams (0.461 mole) of acetic anhydride in 150 ml. benzene, over a period of 2 hours. Stirring was continued for 30 minutes and the mixture allowed to stand overnight. The benzene solution was washed with a sodium carbonate solution and with water, followed by drying over sodium sulfate. The dried benzene solution was then distilled at atmospheric pressure to remove water, followed by distillation at reduced pressure to decrease its volume to 250 ml. To the resulting hot benzene solution were added 200 ml. of hot cyclohexane, and the product allowed to crystallize slowly. 86.2 grams of a white, needlelike product were collected by filtration, giving a yield of 91.2%. This product initially melted at 115.5°–117° C. and upon recrystallization from acetonitrile, the melting point was 116°–117.5° C. The product was identified as 1-acetamine-2-phenylpyrrolidine.

*Analysis.*—Calc'd for $C_{12}H_{16}N_2$ (percent): C, 70.56; H, 7.90; N, 13.71. Found (percent): C, 70.41; H, 7.61; N, 13.60.

EXAMPLE 8

Preparation of the hydrazonium salt of 1-acetamino-2-phenylpyrrolidine

A mixture of 77.0 grams (0.377 mole) of 1-acetamino-2-phenylpyrrolidine and 100 grams (0.67 mole) methyl iodide in 200 ml. dry ether and 100 ml. acetonitrile was refluxed for 4 days. The heating was discontinued and the reaction mixture allowed to stand for one day. The mixture was then seeded and the product slowly crystallized. The reaction solvents were then decanted and 87.5 grams of white prisms melting at 137–139° C. were recovered. The reaction solvents were then refluxed for an additional two days, concentrated, and diluted with dry ether. An additional 11.6 grams of white prisms melting at 137–139° C. were recovered. The white prismatic material was identified as 1-methyl-1-acetamino-2-phenylpyrrolidine. A 76% yield of this material was obtained.

EXAMPLE 9

Preparation of the aminimide, 1-methyl-2-phenylpyrrolidine acetimide

To 75.4 grams (0.218 mole) of 1-methyl-1-acetamino-2-phenylpyrrolidine iodide in 50 ml. water were added 9.0 grams of sodium hydroxide in 10 ml. water. An oil which separated from the aqueous reaction mixture was extracted with three 50-ml. portions of chloroform. The combined chloroform portions were dried over sodium sulfate, filtered, and concentrated to a colorless, viscous oil weighing 42.6 grams. This oil was identified as 1-methyl-2-phenylpyrrolidine acetimide. An 89.5% yield of this material was obtained.

*Analysis.*—Calc'd for $C_{13}H_{10}N_2O$ (percent): C, 71.53; H, 8.21; N, 12.83. Found (percent): C, 71.29; H, 8.49; N, 13.10.

EXAMPLE 10

Preparation of methyl isocyanate 49.4 grams (0.226 mole) 1-methyl-2-phenylpyrrolidine acetimide were distilled in vacuo at a pressure of 0.5 mm. at 180–230° C. 8.8 grams of methyl isocyanate were isolated in cold traps maintained at −78° C. A 67% yield of methyl isocyanate was obtained.

The foregoing examples have described in detail the preparation of phenyl isocyanate and methyl isocyanate. The methods and techniques described are wholly applicable to the preparation of corresponding isocyanates from any of the other previously mentioned aminimides.

Thus, the process of this invention provides a novel route to the formation of valuable isocyanate compounds.

While the process of this invention has been described in detail as applied to the preferred embodiments, various modifications and changes in the process described will readily occur to those skilled in the art. Therefore, it is intended that the invention be limited only as indicated by the scope of the following claims.

What is claimed is:

1. The process for the preparation of an isocyanate having the formula $R(N=C=O)_n$ wherein R is a member selected from the group consisting of aliphatic, cycloaliphatic, and aromatic groups which comprises: pyrolyzing an aminimide having the formula

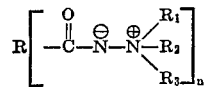

wherein $R_1$, $R_2$ and $R_3$ are members selected from the group consisting of alkyl, aryl and radicals in which $R_2$ and $R_3$ are joined to form a heterocyclic ring, n is an integer of at least 1 and R is as defined above.

2. The process of claim 1 wherein at least one of $R_1$, $R_2$ and $R_3$ is alkyl.

3. The process of claim 1 wherein said aminimide is a dialkylarylamine benzimide and said isocyanate is an untrimerized aryl isocyanate.

4. The process of claim 3 wherein said aminimide is phenyldimethylamine benzimide and said isocyanate is phenyl isocyanate.

5. The process of claim 4 wherein there is also formed during said pyrolysis, dimethylaniline, and said phenyl isocyanate is separated therefrom in substantially pure form by simple distillation.

6. The process for the preparation of an isocyanate having the formula $R(N=C=O)_n$ wherein R is a member selected from the group consisting of aliphatic and cycloaliphatic groups, which comprises: pyrolyzing an aminimide having the formula:

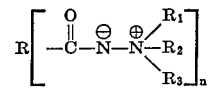

wherein $R_1$, $R_2$ and $R_3$ are members selected from the group consisting of alkyl, aryl and radicals in which $R_2$ and $R_3$ are joined to form a heterocyclic ring, n is an integer of at least 1 and R is as defined above.

7. A process for the preparation of an isocyanate having the formula $R(N=C=O)_n$ wherein R is an aryl group comprising: pyrolyzing an aminimide having the formula

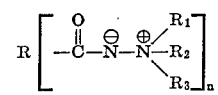

wherein $R_1$, $R_2$ and $R_3$ are alkyl groups, n is an integer of at least 1, and R is an aryl group of valence n, and recovering the isocyanate.

8. The process of claim 7 wherein $R_1$, $R_2$ and $R_3$ are lower alkyl groups.

9. The process of claim 7 wherein $R_1$, $R_2$ and $R_3$ are methyl.

10. The process of claim 7 wherein pyrolysis is conducted in the presence of a high boiling alcohol.

11. The process of claim 7 wherein pyrolysis comprises refluxing the aminimide in aniline.

12. The process of claim 11 wherein the step of recovering comprises treating the pyrolysis product with hydrogenhalides.

13. A process for the preparation of an isocyanate having the formula $R(N=C=O)_n$ wherein R is a member selected from the group consisting of alkyl, alkenyl, polymethylene, and alkylene groups having from 1 to 28 carbon atoms and comprising: pyrolyzing an aminimide of the formula:

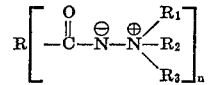

wherein $R_1$, $R_2$, and $R_3$ are alkyl groups, n is an integer of at least 1 and R is as defined above.

14. The process of claim 13 wherein $R_1$, $R_2$ and $R_3$ are lower alkyl.

15. The process of claim 13 wherein R is methyl.

16. The process of claim 13 wherein the pyrolysis product is recovered by in situ in vacuo distillation.

References Cited

UNITED STATES PATENTS 3,488,389  1/1970  McKillip _____ 260—561

OTHER REFERENCES

Gueldner: Dissertation Abstracts, vol. XXV(2), p. 835 (August, 1964).

Gibson et al.: Journal Chem. Soc., pp. 880–2 (1965).

Smith et al.: Chemical Communications, No. 7, p. 120 (Apr. 14, 1965).

LEWIS GOTTS, Primary Examiner

D. H. TORRENCE, Assistant Examiner

U.S. Cl. X.R.

260—247.2A, 268N, 293.88, 326.3, 557H, 558H, 561H